United States Patent
Nainar et al.

(10) Patent No.: US 10,218,616 B2
(45) Date of Patent: Feb. 26, 2019

(54) LINK SELECTION FOR COMMUNICATION WITH A SERVICE FUNCTION CLUSTER

(71) Applicant: Cisco Technology, Inc., San Jose, CA (US)

(72) Inventors: Nagendra Kumar Nainar, San Jose, CA (US); Rajiv Asati, San Jose, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 15/216,294

(22) Filed: Jul. 21, 2016

(65) Prior Publication Data

US 2018/0026887 A1   Jan. 25, 2018

(51) Int. Cl.
| | | |
|---|---|---|
| H04L 12/741 | (2013.01) | |
| H04L 12/733 | (2013.01) | |
| H04L 12/46 | (2006.01) | |
| H04L 12/24 | (2006.01) | |

(52) U.S. Cl.
CPC .......... *H04L 45/74* (2013.01); *H04L 12/4641* (2013.01); *H04L 45/20* (2013.01); *H04L 41/0659* (2013.01)

(58) Field of Classification Search
None
See application file for complete search history.

(56) References Cited

U.S. PATENT DOCUMENTS

| | | | |
|---|---|---|---|
| 3,629,512 A | 12/1971 | Yuan | |
| 4,769,811 A | 9/1988 | Eckberg, Jr. et al. | |
| 5,408,231 A | 4/1995 | Bowdon | |
| 5,491,690 A | 2/1996 | Alfonsi et al. | |
| 5,557,609 A | 9/1996 | Shobatake et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |
| 6,400,681 B1 | 6/2002 | Bertin et al. | |
| 6,661,797 B1 | 12/2003 | Goel et al. | |
| 6,687,229 B1 | 2/2004 | Kataria et al. | |
| 6,799,270 B1 | 9/2004 | Bull et al. | |
| 6,888,828 B1 | 5/2005 | Partanen et al. | |

(Continued)

FOREIGN PATENT DOCUMENTS

| | | |
|---|---|---|
| CN | 103716123 | 4/2014 |
| CN | 103716137 | 4/2014 |

(Continued)

OTHER PUBLICATIONS

Jaing et al. "Fault Management in Service Function Chaining" Oct. 16, 2015 (IDS).*

(Continued)

*Primary Examiner* — Saba Tsegaye (74) *Attorney, Agent, or Firm* — Polsinelli (57) ABSTRACT

Systems, methods, and computer-readable media for improving the reliability of service function (SF) application in a service function chain (SFC) are provided. In some aspects, the subject technology facilitates automatic service function type validation by a service function forwarder (SFF), for example, by using a probe configured query a function type of a SF module associated with the validating SFF.

20 Claims, 6 Drawing Sheets

(56) References Cited

U.S. PATENT DOCUMENTS

| | | |
|---|---|---|
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Mailer et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |

(56) References Cited

U.S. PATENT DOCUMENTS

| | | |
|---|---|---|
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell et al. |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1* | 11/2015 | Lee ............... H04L 12/6418 370/392 |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |

(56) References Cited

U.S. PATENT DOCUMENTS

| | | | |
|---|---|---|---|
| 2016/0173464 | A1 | 6/2016 | Wang et al. |
| 2016/0182336 | A1 | 6/2016 | Doctor et al. |
| 2016/0182342 | A1 | 6/2016 | Singaravelu et al. |
| 2016/0182684 | A1 | 6/2016 | Connor et al. |
| 2016/0212017 | A1 | 7/2016 | Li et al. |
| 2016/0226742 | A1 | 8/2016 | Apathotharanan et al. |
| 2016/0248685 | A1 | 8/2016 | Pignataro et al. |
| 2016/0277250 | A1 | 9/2016 | Maes |
| 2016/0285720 | A1 | 9/2016 | Mäenpääet al. |
| 2016/0323165 | A1 | 11/2016 | Boucadair et al. |
| 2016/0352629 | A1 | 12/2016 | Wang et al. |
| 2016/0380966 | A1 | 12/2016 | Gunnalan et al. |
| 2017/0019303 | A1 | 1/2017 | Swamy et al. |
| 2017/0031804 | A1 | 2/2017 | Ciszewski et al. |
| 2017/0078175 | A1 | 3/2017 | Xu et al. |
| 2017/0187609 | A1 | 6/2017 | Lee et al. |
| 2017/0208000 | A1 | 7/2017 | Bosch et al. |
| 2017/0214627 | A1 | 7/2017 | Zhang et al. |
| 2017/0237656 | A1 | 8/2017 | Gage et al. |
| 2017/0250917 | A1 | 8/2017 | Ruckstuhl et al. |
| 2017/0272470 | A1 | 9/2017 | Gundamaraju et al. |
| 2017/0279712 | A1 | 9/2017 | Nainar et al. |
| 2017/0310611 | A1 | 10/2017 | Kumar et al. |
| 2017/0331741 | A1* | 11/2017 | Fedyk .................. H04L 47/125 |
| 2018/0013841 | A1 | 1/2018 | Nainar et al. |
| 2018/0026884 | A1 | 1/2018 | Nainar et al. |
| 2018/0026887 | A1 | 1/2018 | Nainar et al. |
| 2018/0041470 | A1 | 2/2018 | Schultz et al. |
| 2018/0062991 | A1 | 3/2018 | Nainar et al. |

FOREIGN PATENT DOCUMENTS

| | | |
|---|---|---|
| EP | 3160073 A1 | 4/2017 |
| JP | 2016149686 | 8/2016 |
| WO | WO-2011029321 A1 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO-2016004556 A1 | 1/2016 |
| WO | WO 2016/058245 | 4/2016 |
| WO | WO 2017/011607 | 1/2017 |

OTHER PUBLICATIONS

Panno et al. "Packet Genertion in Service Function Chaine", Apr. 29, 2016. (IDS).*

Penno et al. "Services Function Chaining Traceroute", Sep. 30, 2015. (IDS).*

Extended European Search Report from the European Patent Office for the corresponding European Patent Application No. 17181912.1, dated Nov. 23, 2017, 36 pages.

J. Halpern, et al., "Service Function Chaining (SFC) Architecture," Internet Engineering Task Force (IETF), Cisco, Oct. 2015, 32 pages.

S. Aldrin, et al. "Service Function Chaining Operation, Administration and Maintenance Framework," Internet Engineering Task Force, Oct. 26, 2014, 13 pages.

Y. Jiang, et al., "Fault Management in Service Function Chaining," Network Working Group, China Telecom, Oct. 16, 2015, 13 pages.

Extended European Search Report from the European Patent Office for the corresponding European Patent Application No. 17181912.1, dated Nov. 23, 2017, 36 pages (previously submitted as item #4 in the IDS filed Nov. 28, 2017; re-submitted herewith with a copy of the document).

Author Unknown, "ANSI/SCTE 35 2007 Digital Program Insertion Cueing Message for Cable," Engineering Committee, Digital Video Subcommittee, American National Standard, Society of Cable Telecommunications Engineers, ©Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, ©ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unkown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streannning_over_HTTP&oldid=519749189.

Author Unknown, "GStreamer an in-band metadata," from RidgeRun Developer Connction, Jun. 19, 2012, 5 pages https://developersidgerun.conn/wiki/index.php/GStreanner_and_in-Band_nnetadata.

Author Unknown, "ISO/IEC JTC 1/SC 29, Information Technology—Dynamic Adaptive Streaming over HTTP (DASH)—Part 1: Media Presentation Description and Segment Formats," International Standard ©ISO/IEC 2012—All Rights Reserved; Jan. 5, 2012; 131 pages.

Author Unknown, "M-PEG 2 Transmission," ©Dr. Gorry Fairhurst, 9 pages [Published on or about Jan. 12, 2012] http://www.erg.abdn.ac.uk/future-net/digitial-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institue, Oct. 2013, 50 pages.

Author Unknown, "Understanding Azure, A Guide for Developers," Microsoft Corporation Copyright ©2016 Microsoft Corporation, 39 pages.

Baird, Andrew, et al. "AWS Serverless Multi-Tier Architectures; Using Amazon API Gateway and AWS Lambda," Amazon Web Services Inc., Nov. 2015, 20 pages.

Boucadair, Mohamed, et al., "Differentiated Service Function Chaining Framework," Network Working Group Internet Draft draft-boucadair-network-function-chaining-03, Aug. 21, 2013, 21 pages.

Cisco Systems, Inc. "Cisco NSH Service Chaining Configuration Guide," Jul. 28, 2017, 11 pages.

Ersue, Mehmet, "ETSI NFV Management and Orchestration—An Overview," Presentation at the IETF# 88 Meeting, Nov. 3, 2013, 14 pages.

Fayaz, Seyed K., et al., "Efficient Network Reachability Analysis using a Succinct Control Plane Representation," 2016, ratul.org, pp. 1-16.

Hendrickson, Scott, et al. "Serverless Computation with OpenLambda," Elastic 60, University of Wisconson, Madison, Jun. 20, 2016, 7 pages, https://www.usenix.org/system/files/conference/hotcloud/hotcloud16_hendrickson.pdf.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, Paul, et al., "Network Service Header," Network Working Group, draft-quinn-nsh-00.txt, Jun. 13, 2013, 20 pages.

(56) References Cited

OTHER PUBLICATIONS

Quinn, Paul, et al., "Network Service Header," Network Working Group Internet Draft draft-quinn-nsh-01, Jul. 12, 2013, 20 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; http://techcrunch.com/2016/08/03/what-real-cloud-native-apps-will-look-like/.
3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.
3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Val bonne—France, Sep. 2005; 30 pages.
3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Val bonne—France, Mar. 2010; 116 pages.
3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E- UTRAN) access (Release 13), 3GPP, 650 Route des Lucioles—Sophia Antipolis Valbonne—France, Dec. 2015.
3GPP TS 29.212 V13.1.0 (Mar. 2015) Technical Specification: 3rd Generation Partnership Project; Technical Specification Group Core Network and Terminals; Policy and Chargig Control (PCC); Reference points (Release 13), 3rd Generation Partnership Project (3GPP), 650 Route des Lucioles—Sophia Antipolis Valbonne—France, Mar. 2015; 230 pages.
U.S. Appl. No. 15/252,028, filed Aug. 30, 2016, entitled "System and Method for Managing Chained Services in a Network Environment," Inventor(s): Hendrikus G.P. Bosch, et al.
P. Quinn, et al., "Network Service Header," Network Working Group, Feb. 14, 2014, 21 pages; https://svn.tools.ietf.org/html/draft-quinn-sfc-nsh-02.
P. Quinn, et al., "Service Function Chaining (SFC) Architecture," Network Working Group, May 5, 2014, 31 pages; https://svn.tools.ietf.org/html/draft-quinn-sfc-arch-05.
International Search Report and Written Opinion from the International Searching Authority, dated Aug. 30, 2017, for the corresponding International Application No. PCT/US2017/040575, 13 pages.
Alizadeh, Mohammad, et al., "CONGA: Distributed Congestion-Aware Load Balancing for Datacenters," SIGCOMM '14, Aug. 17-22, 2014, 12 pages.
Author Unknown, "IEEE Standard for the Functional Architecture of Next Generation Service Overlay Networks, IEEE Std. 1903-2011," IEEE, Piscataway, NJ, Oct. 7, 2011; 147 pages.
Author Unknown, "OpenNebula 4.6 User Guide," Jun. 12, 2014, opennebula.org, 87 pages.
Author Unknown, "Service-Aware Network Architecture Based on SDN, NFV, and Network Intelligence," 2014, 8 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Bremler-Barr, Anat, et al., "Deep Packet Inspection as a Service," CoNEXT '14, Dec. 2-5, 2014, pp. 271-282.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Farrel, A., et al., "A Path Computation Element (PCE)—Based Architecture," RFC 4655, Network Working Group, Aug. 2006, 40 pages.
Jiang, Y., et al., "An Architecture of Service Function Chaining," IETF Network Working Group Internet Draft, draft-jiang-sfc-arch-01.txt, Feb. 14, 2014; 12 pages.
Katsikas, Goergios P., et al., "Profiling and accelerating commodity NFV service chains with SCC," The Journal of Systems and Software, vol. 127, Jan. 2017, pp. 12-27.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Service Function Chaining: Creating a Service Plane via Network Service Headers," IEEE Computer Society, 2014, pp. 38-44.
Zhang, Ying, et al. "StEERING: a Software-Defined Networking for Inline Service Chaining," IEEE, 2013, IEEE, p. 10 pages.
Extended European Search Report dated Sep. 20, 2018, 7 pages, from the European Patent Office for the corresponding European Patent Application No. 18185068.6.
Bottorff, P., et al., "Ethernet MAC Chaining," draft-fedyk-sfc-mac-chain-01.txt, Network Working Group, Broadcom, Jan. 20, 2016, pp. 1-23.
Xu, X., et al., "Service Function Chaining Using MPLS-SPRING," draft-xu-sfc-using-mpls-spring-01, Network Working Group, Telefonica I+D, Oct. 8, 2014, pp. 1-7.
You, J., et al., "Service Function Chaining OAM in MPLS-SPRING Networks," draft-you-mpls-spring-sfc-oam-01, Mpls Working Group, Huawei, Jan. 11, 2015, pp. 1-9.
Zhang, Cathy, et al., "L4-L7 Service Function Chaining Solution Architecture," Open Networking Foundation, Version 1.0, Jun. 14, 2015, pp. 1-36.

* cited by examiner

LINK SELECTION FOR COMMUNICATION WITH A SERVICE FUNCTION CLUSTER

TECHNICAL FIELD

The disclosed technology relates to systems and methods for selecting a transmission link between a service function forwarder (SFF) and a service function cluster (SF cluster). In particular, aspects of the technology relate to the implementation of a label forwarding table (e.g., at a SFF), that is used to identify a physical link/target virtual machine (VM) configured to implement a service function (SF) on a host device.

BACKGROUND

Network Function Virtualization (NFV) technology, in combination with Software Defined Networking (SDN), promises to help transform today's carrier networks. For example, NFV technology may transform carrier network deployment and management, as well as the way services are delivered. Some ultimate goals are to enable service providers to reduce costs, increase business agility, and accelerate the time to market of new services.

The utilization of NFV and SDN technologies allows the decoupling of network functions from underlying hardware so they run as software images or logical modules on commercial off-the-shelf and purpose-built hardware. The NFV does so by using virtualization technologies (computers, networks, and storage media) to virtualize the network functions. The objective is to reduce the dependence on dedicated physical devices by allocating and using the physical and virtual resources only when and where needed. With this approach, service providers can reduce overall costs by shifting components to a common physical infrastructure while optimizing its use, allowing them to respond more dynamically to changing market demands by deploying new applications and services as needed. The virtualization of network functions accelerates the time to market for new services by allowing for more automated and streamlined approaches to service delivery.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Description

A "service function module" (SF module), or "SF instance" can be implemented using a combination of hardware and/or software solutions, physical or virtual. Service function (SF) invocation on a SF module can be facilitated using a service function forwarder (SFF), for example that is configured to receive a packet, make a determination regarding an applicable service function type, and based on the determination, forward the packet to the appropriate SF module for function invocation. Similar to other virtualized network components, as used herein, a SFF can be a logical module implemented using a variety of hardware and software solutions, physical or virtual. For example, SF and SFF modules can be implemented by one or more software routines (e.g., VMs) executed on the same physical host.

In some virtualized environments, multiple SF modules can be implemented by one or more virtual machines (VMs) residing on a common physical host, e.g., in a service function cluster (SF cluster). For example, a SF cluster can include multiple VMs, configured for performing the same (or a similar) service function, e.g., for purposes of redundancy and/or load distribution.

In some routing architectures, such as segment routing and multi-protocol labeled switching (MPLS), the SFF module locally determines which physical link (e.g., L2 member link) and VM are to receive forwarded traffic. That is, physical link and VM load balancing decisions are performed locally by the SFF, and not at a remote source.

In some aspects, source-based load is desired, for example, such that physical link and/or VM selection can be performed remotely, such as, at a forwarding classifier, or a controller operated by a network administrator. Aspects of the technology address the foregoing limitations by providing a label forwarding table to facilitate a forwarding equivalence class (FEC) lookup, based on a received label. In this manner, load balancing between physical links and/or virtual machines can be accomplished, improving overall SF cluster functionality.

Traffic inbound to the SFF can include label identifiers used by the receiving SFF to identify physical link routes and/or VM destinations. When a labeled packet is received by the SFF module, a lookup is performed (e.g., in the label forwarding table) to identify physical link and destination VM that correspond with the label. The received label is then removed ("popped'), and the packet is amended with physical address information (e.g., a media access control (MAC) address) of the destination VM and sent over the desired physical link. The packet is then forwarded to the chosen VM via the identified physical link.

The foregoing source based label lookup solution addresses multiple potential failure event scenarios. In one aspect, if the forwarding SFF detects a link failure, the SFF module can select a backup entry in the label forwarding table, e.g., to reroute forwarded traffic via another L2 member link but to the same VM.

In another aspect, upon failure of one or more VM in the SF cluster, the failure can be detected by the forwarding SFF, and the SFF can temporarily reroute the traffic to one or more VMs in the same cluster.

In yet another aspect, if a load for a particular VM in the SF cluster is exceeded, the SFF could detect the overload, e.g. via a flag provided by the SF in a network services header (NSH), and temporarily reroute the traffic to one or more other VMs in the SF cluster.

Figure 1:
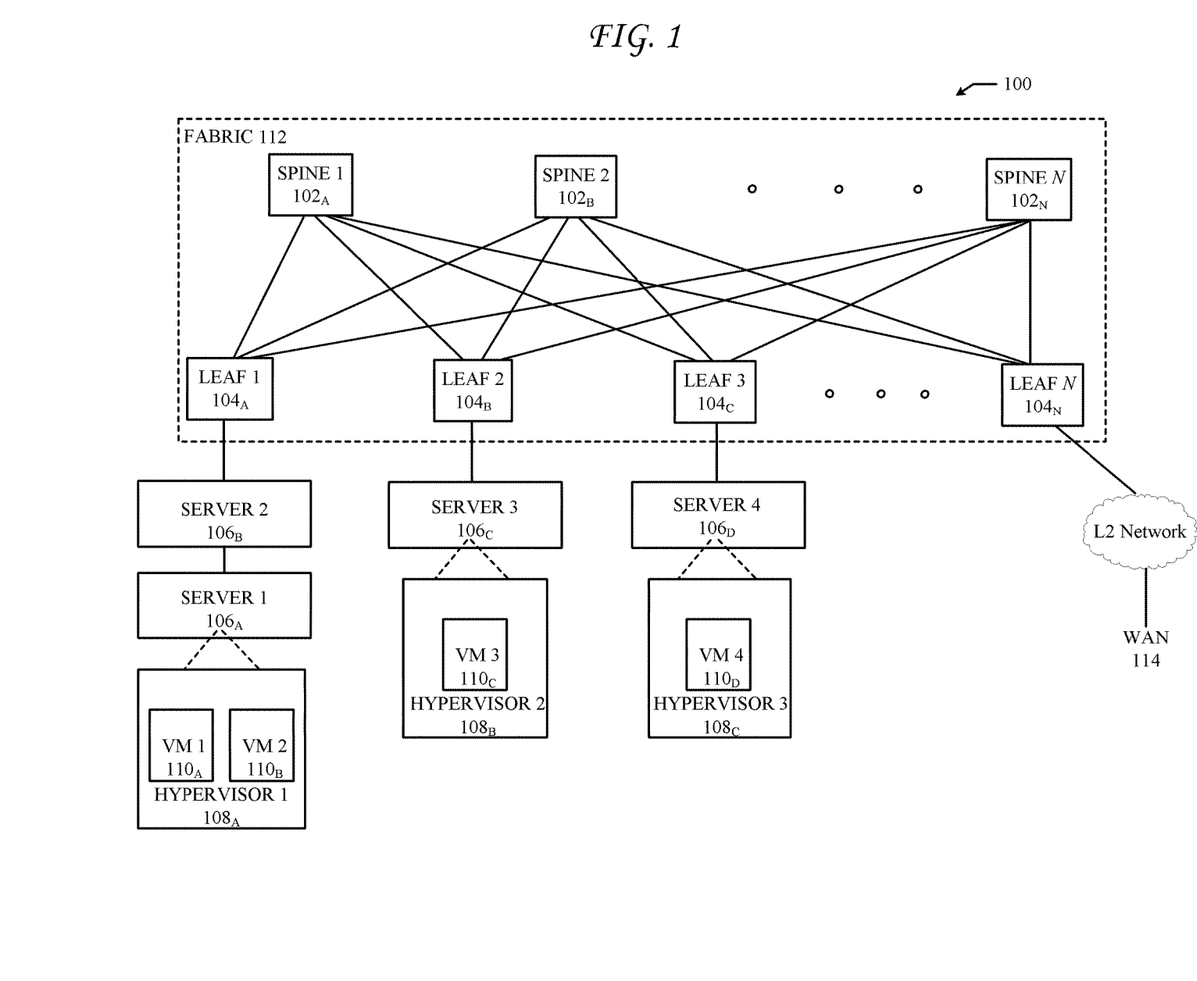
FIG. 1 illustrates a diagram of an example virtual network environment, according to some aspects of the subject technology.

FIG. 1 illustrates a diagram of an example virtual network environment 100 in which one or more service function chains can be implemented. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-4 ($106_{A-D}$) (collectively "106"), hypervisors 1-4 ($108_A$-$108_D$) (collectively "108"), virtual machines (VMs) 1-4 ($110_A$-$110_D$) (collectively "110"), collectors 118, engines 120, and the Layer 2 (L2) network access to fabric 112. For example, leaf routers 104 can encapsulate and decapsulate packets to and from servers 106 in order to enable communications throughout environment 100. Leaf routers 104 can also connect other network-capable device(s) or network(s), such as a firewall, a database, a server, etc., to the fabric 112. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106_C$ and hypervisor $108_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Figure 2A:
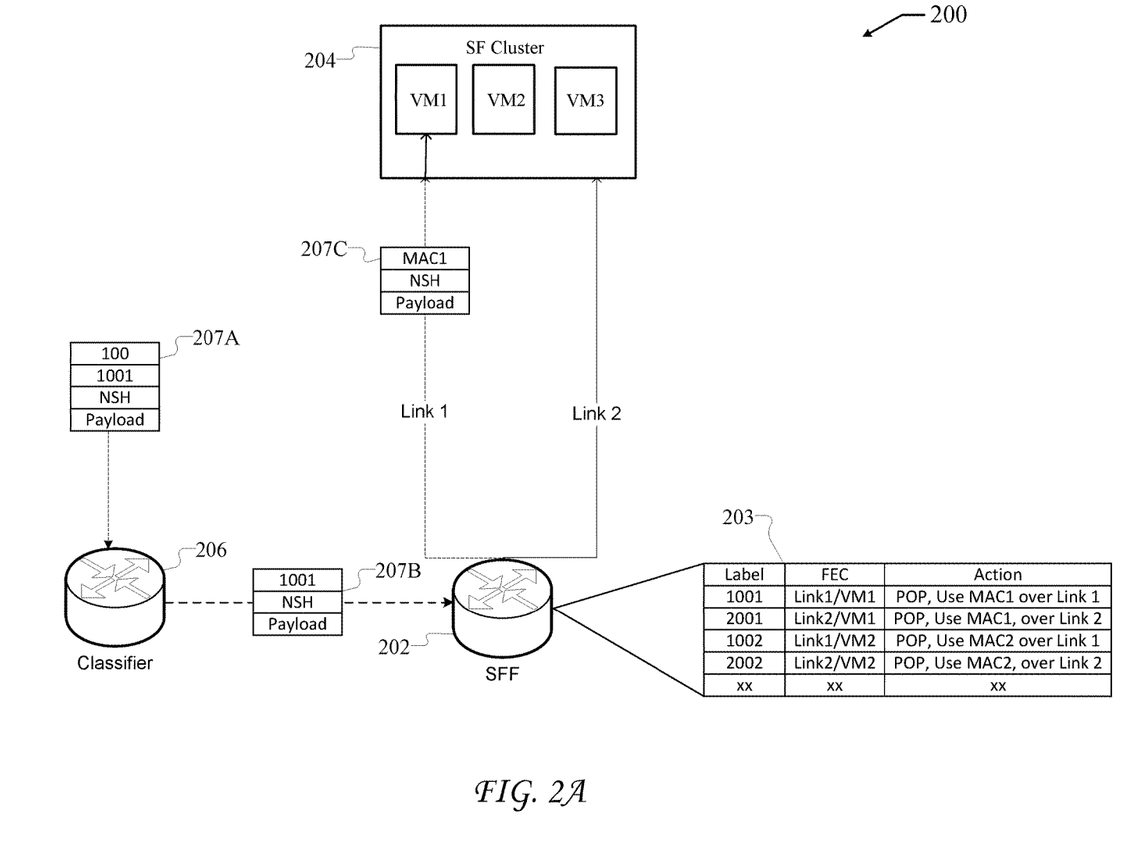
FIGS. 2A and 2B conceptually illustrate an example network for facilitating packet transport from a service function forwarder (SFF) to a service function cluster (SF cluster).
Figure 2B:
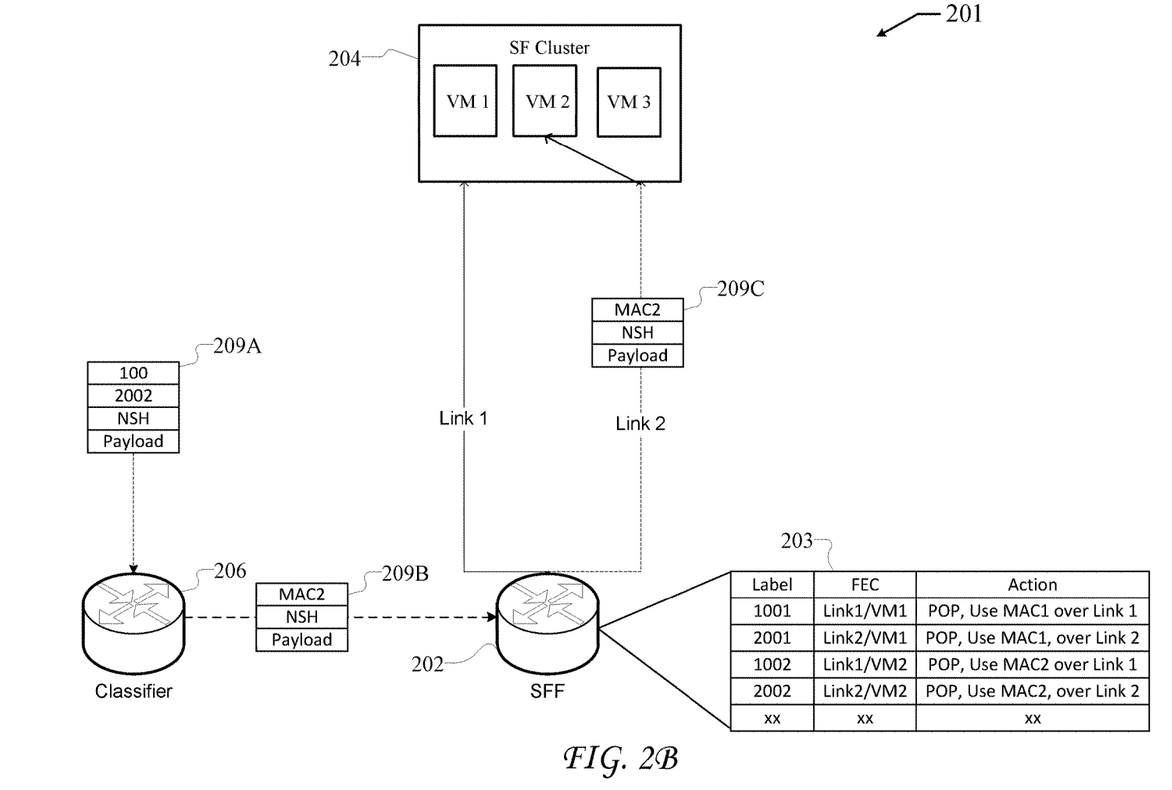

FIGS. 2A and 2B conceptually illustrate an example network environment 200 for facilitating packet transport from a service function forwarder (SFF) to a service function cluster (SF cluster), according to some aspects of the technology.

Referring to FIG. 2A, environment 200 includes a service function forwarder (SFF) 202 configured to provide connectivity between SF cluster 204, and a classifier 206. SFF 202 is communicatively coupled to a SF cluster 204 via multiple physical links (i.e., layer 2 links), such as Link 1, and Link 2. In the topology of environment 200, SFF 202 is configured to receive traffic from classifier 206, and direct the traffic to SF cluster 204, for example, to implement a service function on one or more packets provided to SF cluster 204.

As further illustrated in environment 200, SFF 202 includes label routing table 203 that can be used to identify a desired physical link for transmitting traffic SF cluster 204. As discussed in further detail below, label routing table 203 can also be used to direct traffic forwarded from SFF 202 to a specific virtual machine (VM) on SF cluster 204.

SF cluster 204 is illustrated as having three virtual machines; however, it is understood the physical host used to implement SF cluster 204 may include a greater (or fewer) number of virtual machines. Additionally, it is understood that a greater number of physical links can be used to provide connectivity between SFF 202 and SF cluster 204, without departing from the scope of the technology. Similarly, label routing table 203 can include any number of label/FEC pairs, entries for which may contain any type of data used to identify physical links and/or destination VM addresses.

Label routing table 203 can be used by SFF 202 to identify a preferred physical link and/or VM destination for a received packet. In environment 200, packet 207A contains four data types: a SFF label (e.g., "100") that identifies a destination service function forwarder for the receiving classifier; a SF label or SF cluster label (e.g., "1001") that provides a label entry for reference by the receiving SFF; network service header (NSH) information; and, payload data. It is understood that other labels or data fields can be included in packet 207A, without departing from the scope of the subject technology.

In practice, packet 207A is received by classifier 206, which then determines where to forward packet 207A based on its designated SFF label (e.g. "100"). The SFF label is then removed (i.e., "popped"), and the packet, now 207B, is forwarded to SFF 202. The SF label of packet 207A is then referenced by SFF 202 using label forwarding table 203 to determine if there is a physical link and/or VM destination specified for handling of packet 207A. The SF label of packet 207A is popped and replaced with address information associated with the desired physical link and destination VM pair.

In this example, SF label "1001" maps to a forwarding equivalence class (FEC) corresponding with Link 1 and destination VM1. Therefore SFF 202 references label forwarding table 203 to determine and FEC associated with label 1001. Subsequently, the SF label is popped and replaced with MAC address information for the destination VM (e.g., VM1). Packet 207C is then forwarded to SF cluster 204 using the chosen physical link (e.g., Link 1) and VM destination (e.g., VM1). As discussed above, the receiving VM can be used for supporting the application of one or more service function types on the received packet (e.g., firewall, deep packet inspection, etc.). Once the service function is applied, the packet can be returned to SFF 202 for further forwarding throughout the network, or along a service function chain.

FIG. 2B conceptually illustrates example environment 201, in which packet transport is provided from SFF 202 to SF cluster 204. In environment 201, packet 209A is received by classifier 206 and forwarded to SFF 202. Similar to the foregoing example described with respect to FIG. 2A, packet 209A includes a labels for SFF routing (e.g., "100"), as well as a SF label (e.g., "2002"), used to identify a physical link and destination VM at the target SF cluster. After packet 209A is received by classifier 206 the SFF label is popped and the resulting packet (e.g., packet 209B) is forwarded to SFF 202.

Once packet 209B is received by SFF 202 the SF label (i.e., "2002") is referenced for comparison with label forwarding table 203 to identify matching FEC entries. In this example, SF label "2002" is associated with an FEC entry corresponding with a physical Link2 and VM2. Since the SF label can be properly identified in this scenario, SFF 202 pops the SF label and inserts MAC address information for the destination VM (VM2), creating packet 209C. Packet 209C is then forwarded to SF cluster 204 along the chosen physical link (Link2).

Figure 3:
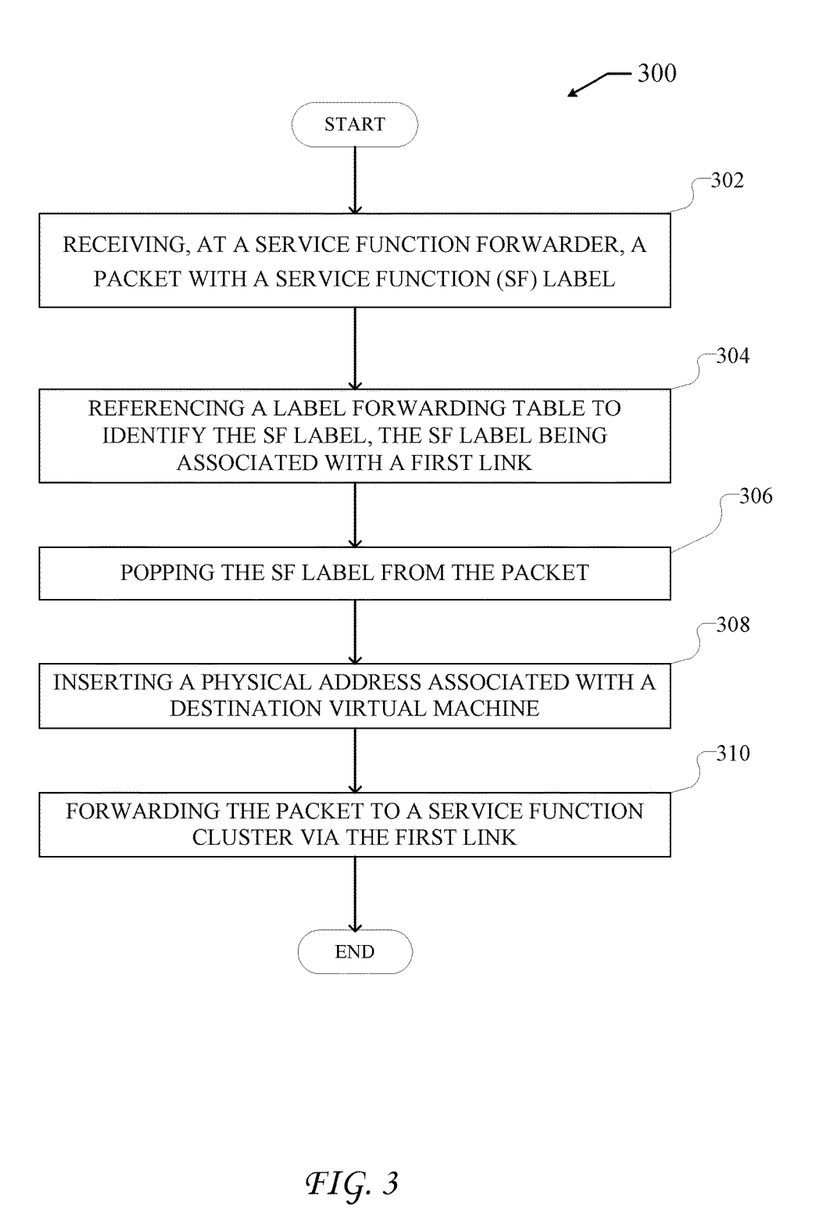
FIG. 3 illustrates steps of an example method that can be used to forward a packet from a SFF to a SF cluster.

FIG. 3 illustrates steps of an example method 300 for forwarding traffic to an SF cluster. Method 300 begins at step 302 when a packet is received at a service function forwarder (SFF) that includes a service function label (e.g., an SF label). As discussed above, the packet may be received at the SFF via a classifier. However, packets received by the SFF can originate from other types of nodes in the network, such as at a controller, without departing from the scope of the technology.

In step 304, the SFF performs operations for referencing a label forwarding table to identify the SF label. Identification of the SF label can include performing a comparison between the SF label in one or more data entries in the label forwarding table. Additionally, it is understood that the label forwarding table can be stored locally, for example, on a host memory device shared by the receiving SFF instance. Alternatively, the label forwarding table may be stored at a remote location, such as on a memory device and/or host that physically separate from the SFF.

As discussed above, the label forwarding table can correlate SF labels with physical link and/or destination VM information. By referencing the label forwarding table, the SFF can determine a physical link used to forward the received packet to a particular VM on the SF cluster.

In step 306, after the SF label is identified in the label forwarding table, the SFF pops the SF label from the packet.

In step 308, a physical address associated with the desired destination VM is inserted into the packet. Although various types of address information can be used, in some aspects the physical address can correspond with a MAC address of the destination VM. Once the MAC address is inserted into the packet, at step 310 the packet is forwarded to the destination VM (at the SF cluster), via the indicated physical link.

Implementations of the foregoing technology solve several problems relating to network load balancing and SFF link failure. For example, by storing an address forwarding table that includes link/destination VM information, the SFF can determine how to reroute traffic to a destination VM in the event of a link failure (as opposed to simply dropping the traffic).

The SFF can also be configured to detect failure of a given VM in the SF cluster. For example, the SFF may be notified of VM failure using one or more failure detection mechanisms, such as, but not limited to bidirectional forwarding detection (BFD). Upon detection of a VM failure event, the SFF can temporarily reroute traffic to one or more VMs remaining in the SF cluster. Therefore, they will base routing techniques of the subject technology can enable the SFF to perform load balancing among remaining VMs in the SF cluster.

In another aspect, the SFF can use the label forwarding table to perform load balancing amongst various VMs in an SF cluster. By way of example, an overloaded VM can signal that its capacity has been exceeded by sending a packet to the SFF e.g., By setting a flag for "load" in the packet's NSH base header. Upon receiving the flag from a given VM, the SFF can temporarily redirect traffic amongst one or more other VMs in the SF cluster.

Figure 4:
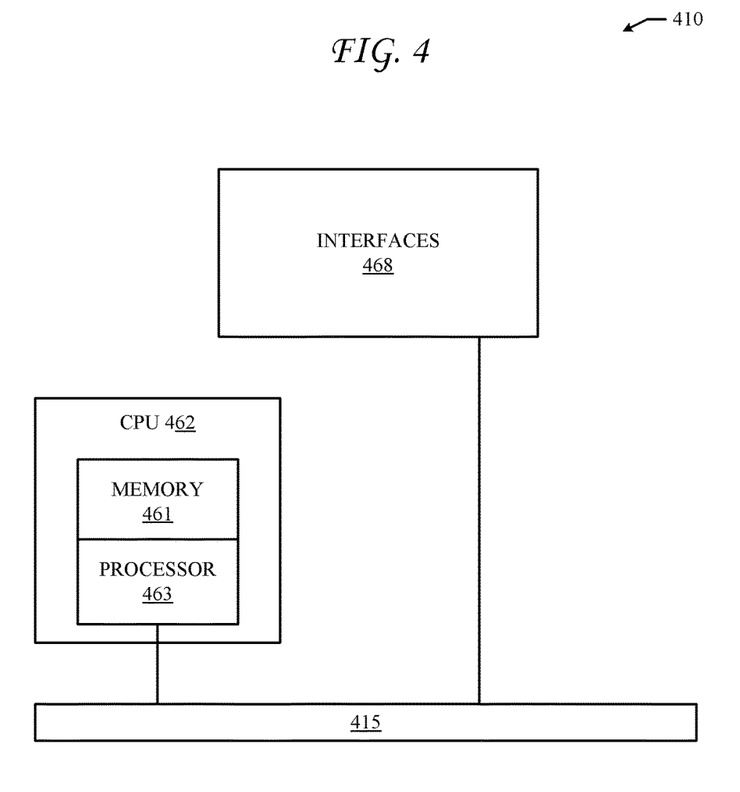
FIG. 4 illustrates an example of a network device.

FIG. 4 illustrates an example network device 410 according to some embodiments. Network device 410 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5A:
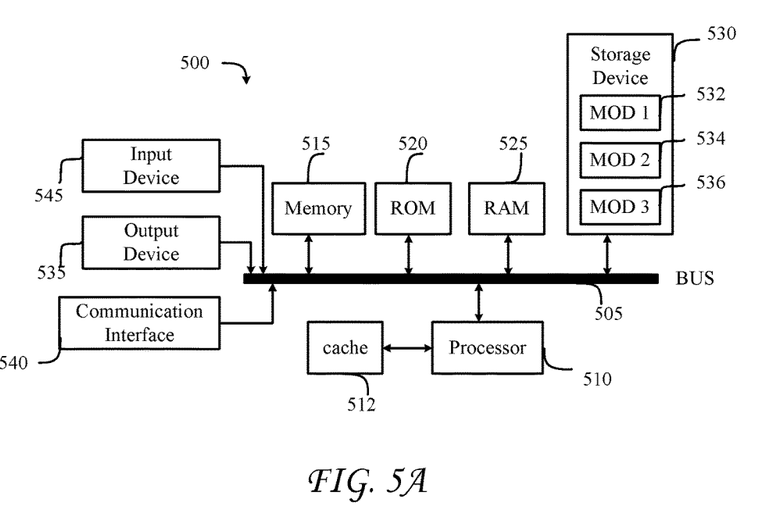
FIGS. 5A and 5B illustrate example system implementations.
Figure 5B:
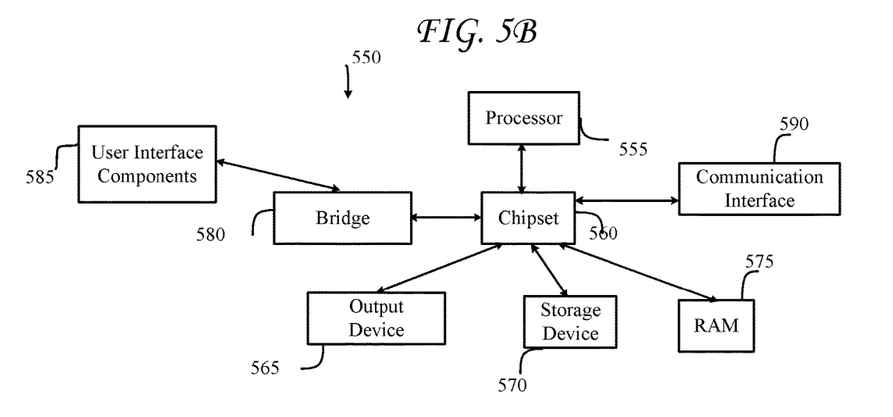

FIG. 5A and FIG. 5B illustrate example system embodiments. The more appropriate embodiment will be apparent to those of skill in the art when practicing the present technology. Persons of ordinary skill in the art will also readily appreciate that other system embodiments are possible.

FIG. 5A illustrates a system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 can be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor can be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method, comprising:
receiving, at a service function forwarder (SFF), a first packet comprising a first service function (SF) label;
referencing a label forwarding table to identify a first link for the first SF label;
popping the first SF label from the first packet;
in response to the popping, inserting into the first packet a physical address associated with the first link; and
forwarding the packet to a service function cluster (SFC) via the first link, the SFC being at remote location from the SFF.

2. The method of claim 1, wherein the referencing the label forwarding table to identify the first SF label further comprises:
comparing the first SF label to one or more label entries in the label forwarding table; and
determining a media access control (MAC) address associated with the first link.

3. The method of claim 1, further comprising:
receiving, at the SFF, a second packet comprising a second SF label;
referencing the label forwarding table to identify a second link for the second SF label; and
forwarding the second packet to the SFC via the second link.

4. The method of claim 1, wherein the label forwarding table comprises a plurality of labels, and wherein each of the plurality of labels is associated with at least one forwarding equivalence class (FEC).

5. The method of claim 4, wherein each FEC specifies a physical link and a virtual machine instantiated on the SFC.

6. The method of claim 1, wherein the first link is a physical address of a destination virtual machine.

7. The method of claim 1, further comprising:
identifying an inoperable link in the SFC; and
the referencing a label forwarding table to identify a first link for the first SF label being at least partially based on the identifying to thereby reroute the packet around the inoperable link.

8. A system comprising a service function forwarder (SFF) having a non-transitory computer readable memory and a processor configured to cooperate with instructions in memory to perform operations comprising:
receiving, at the SFF, a first packet comprising a first service function (SF) label;
referencing a label forwarding table to identify a first link for the first SF label;
popping the first SF label from the first packet;
in response to the popping, inserting into the first packet a physical address associated with the first link; and
forwarding the packet to a service function cluster (SFC) via the first link, the SFC being at remote location from the SFF.

9. The system of claim 8, wherein the referencing the label forwarding table to identify the first SF label further comprises:
comparing the first SF label to one or more label entries in the label forwarding table; and
determining a media access control (MAC) address associated with the first link.

10. The system of claim 8, the operations further comprising:
receiving, at the SFF, a second packet comprising a second SF label;
referencing the label forwarding table to identify a second link for the second SF label; and
forwarding the second packet to the SFC via the second link.

11. The system of claim 8, wherein the label forwarding table comprises a plurality of labels, and
wherein each of the plurality of labels is associated with at least one forwarding equivalence class (FEC).

12. The system of claim 8, wherein each FEC specifies a physical link and a virtual machine instantiated on the SFC.

13. The system of claim 8, wherein the first link is a physical address of a destination virtual machine.

14. The system of claim 8, the operations further comprising:
identifying an inoperable link in the SFC; and
the referencing a label forwarding table to identify a first link for the first SF label being at least partially based on the identifying to thereby reroute the packet around the inoperable link.

15. A non-transitory computer readable media including instruction which when executed by a processor perform operations comprising:
receiving, at a service function forwarder (SFF), a first packet comprising a first service function (SF) label;
referencing a label forwarding table to identify a first link for the first SF label;
popping the first SF label from the first packet; and
in response to the popping, inserting into the first packet a physical address associated with the first link; and
forwarding the packet to a service function cluster (SFC) via the first link, the SFC being at remote location from the SFF.

16. The media of claim 15, wherein the referencing the label forwarding table to identify the first SF label further comprises:
comparing the first SF label to one or more label entries in the label forwarding table; and
determining a media access control (MAC) address associated with the first link.

17. The media of claim 15, the operations further comprising:
receiving, at the SFF, a second packet comprising a second SF label;
referencing the label forwarding table to identify a second link for the second SF label; and
forwarding the second packet to the SFC via the second link.

18. The media of claim 15, wherein the label forwarding table comprises a plurality of labels, and
wherein each of the plurality of labels is associated with at least one forwarding equivalence class (FEC).

19. The media of claim 15, wherein each FEC specifies a physical link and a virtual machine instantiated on the SFC.

20. The media of claim 15, the operations further comprising:
identifying an inoperable link in the SFC; and
the referencing a label forwarding table to identify a first link for the first SF label being at least partially based on the identifying to thereby reroute the packet around the inoperable link.

* * * * *